(12) United States Patent
Montgomery et al.

(10) Patent No.: US 7,852,198 B2
(45) Date of Patent: Dec. 14, 2010

(54) RF TAG

(75) Inventors: Michael Scott Montgomery, Boise, ID (US); Perry A. Miller, San Diego, CA (US); Wai Kwan Chan, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1183 days.

(21) Appl. No.: 11/488,261

(22) Filed: Jul. 18, 2006

(65) Prior Publication Data

US 2008/0048837 A1    Feb. 28, 2008

(51) Int. Cl.
*H04Q 5/22* (2006.01)

(52) U.S. Cl. .............. 340/10.51; 340/5.25; 340/572.1; 358/1.15

(58) Field of Classification Search .............. 340/10.51, 340/572.1, 5.25; 358/1.15
See application file for complete search history.

(56) References Cited

U.S. PATENT DOCUMENTS

| | | | | |
|---|---|---|---|---|
| 5,488,223 A * | 1/1996 | Austin et al. ................. | 235/375 |
| 5,517,194 A | 5/1996 | Carroll et al. | |
| 5,562,621 A * | 10/1996 | Claude et al. .......... | 604/100.03 |
| 5,949,335 A * | 9/1999 | Maynard .................. | 340/572.1 |
| 5,959,529 A * | 9/1999 | Kail, IV ................. | 340/539.12 |
| 6,046,676 A | 4/2000 | Ward et al. | |
| 6,177,860 B1 * | 1/2001 | Cromer et al. ............. | 340/10.1 |
| 6,720,866 B1 * | 4/2004 | Sorrells et al. ............. | 340/10.4 |
| 6,769,604 B2 | 8/2004 | Ichikawa et al. | |
| 6,795,935 B1 * | 9/2004 | Unkle et al. ................. | 714/37 |
| 6,808,255 B1 * | 10/2004 | Haines et al. ................. | 347/86 |
| 6,876,295 B1 * | 4/2005 | Lewis ....................... | 340/10.34 |
| 6,885,288 B2 * | 4/2005 | Pincus ..................... | 340/10.51 |
| 7,267,269 B2 * | 9/2007 | Kikuchi ....................... | 235/383 |
| 7,289,027 B2 * | 10/2007 | Hunt et al. ............... | 340/572.1 |
| 7,304,573 B2 * | 12/2007 | Postma ................... | 340/572.1 |
| 7,307,534 B2 * | 12/2007 | Pesavento ................ | 340/572.1 |
| 7,379,799 B2 * | 5/2008 | Cleary et al. ................... | 701/29 |
| 7,511,848 B2 * | 3/2009 | Crosier et al. .............. | 358/1.15 |
| 2002/0140966 A1 * | 10/2002 | Meade et al. .............. | 358/1.15 |
| 2002/0191998 A1 * | 12/2002 | Cremon et al. ................. | 400/76 |
| 2003/0023517 A1 | 1/2003 | Marsh et al. | |
| 2003/0032446 A1 * | 2/2003 | Pincus ........................ | 455/556 |
| 2003/0135246 A1 * | 7/2003 | Mass et al. .................... | 607/60 |
| 2003/0141985 A1 | 7/2003 | Haller et al. | |
| 2003/0150908 A1 * | 8/2003 | Pokorny et al. ............. | 235/375 |
| 2003/0154144 A1 | 8/2003 | Pokorny et al. | |
| 2003/0158795 A1 | 8/2003 | Markham et al. | |
| 2005/0109829 A1 * | 5/2005 | Postma ....................... | 235/375 |
| 2005/0267882 A1 * | 12/2005 | Aupperlee et al. ............. | 707/4 |
| 2005/0280511 A1 * | 12/2005 | Yokoyama et al. ......... | 340/10.5 |
| 2006/0017962 A1 * | 1/2006 | Burdette et al. ............ | 358/1.15 |
| 2006/0022800 A1 * | 2/2006 | Krishna et al. ............. | 340/10.2 |
| 2006/0022829 A1 * | 2/2006 | Pan .......................... | 340/572.3 |
| 2006/0181395 A1 * | 8/2006 | Gruszynski ............... | 340/10.51 |
| 2006/0211494 A1 * | 9/2006 | Helfer ........................ | 463/30 |
| 2006/0222430 A1 * | 10/2006 | Duckett et al. .............. | 400/583 |
| 2007/0023516 A1 * | 2/2007 | Chapman et al. ............. | 235/432 |
| 2007/0159779 A1 * | 7/2007 | Chang ........................ | 361/683 |
| 2007/0270694 A1 * | 11/2007 | Pelissier et al. ............. | 600/443 |
| 2007/0273517 A1 * | 11/2007 | Govind ..................... | 340/572.1 |
| 2008/0083824 A1 * | 4/2008 | Postma ....................... | 235/375 |
| 2008/0114228 A1 * | 5/2008 | McCluskey et al. .......... | 600/365 |
| 2008/0196170 A1 * | 8/2008 | Choi ............................ | 8/137 |

* cited by examiner

*Primary Examiner*—Benjamin C Lee
*Assistant Examiner*—Quang Pham (57) ABSTRACT

Various embodiments and methods relating to a radio frequency (RF) tag storing custom settings of an electronic device are disclosed.

10 Claims, 6 Drawing Sheets

RF TAG

CROSS-REFERENCE TO RELATED PATENT APPLICATIONS

The present application is related to U.S. patent application Ser. No. 11/488,348 filed on the same date as the present application by Michael Scott Montgomery, Lin-Fat Chris Lee and William H. Pickel and entitled CODE UPGRADE, the full disclosure of which is hereby incorporated by reference.

The present application is related to copending U.S. patent application Ser. No. 11/488,489 filed on the same date as the present application by Mehrban Jam, Salil Pradhan and Cyril Brignone and entitled METHOD AND APPARATUS FOR LOCALIZATION OF CONFIGURABLE DEVICES, the full disclosure of which is hereby incorporated by reference.

BACKGROUND

Some electronic devices provide their users the opportunity to customize particular selection settings. Upon failure of such devices, such customized selection settings may be lost. Diagnosing the cause of the failure of the device may also be difficult.

DETAILED DESCRIPTION OF THE EXAMPLE EMBODIMENTS

Figure 1:
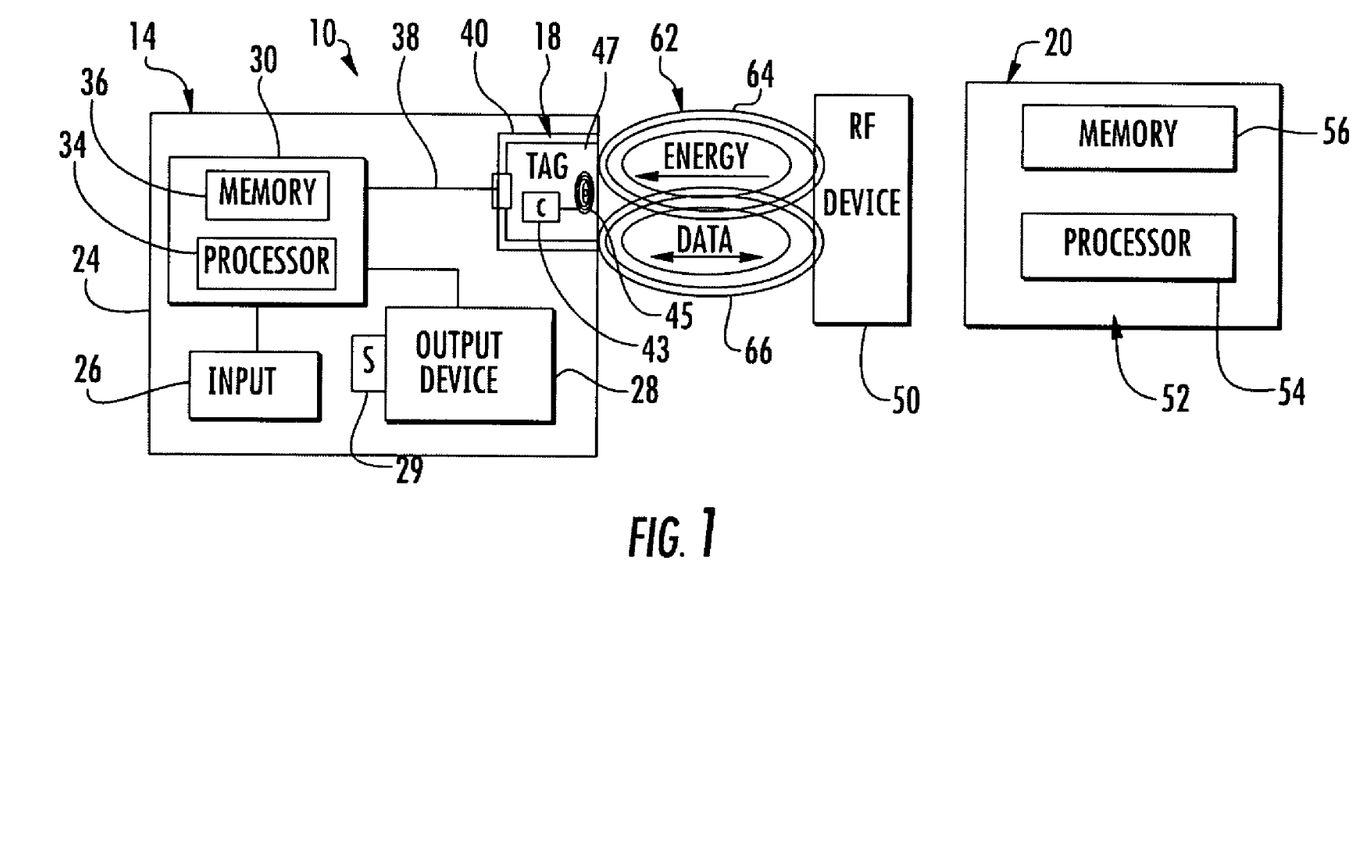
FIG. 1 is schematic illustration of one example of a RF recording and retrieval system according to an example embodiment.

FIG. 1 schematically illustrates a RF recording and retrieval system 10 according to one example embodiment. System 10 is configured to facilitate the recording of information or data associated with an electronic device, the data of which may otherwise be lost upon failure of the device, to a radio frequency (RF) tag, permitting wireless data retrieval. In other words, system 10 functions like an in-flight recorder, preserving information pertaining to an electronic device.

System 10 generally includes electronic device 14, RF tag 18, and retrieval system 20. Electronic device 14 comprises a device configured to perform one or more functions electronically. Examples of electronic device 14, include, but are not limited to, printers, digital cameras, scanners, projectors, televisions, facsimile machines, all-in-one devices, MP3 players, mobile phones, game consoles and the like.

Electronic device 14 includes housing 24, input 26, output device 28, sensor 29 and controller 30. Housing 24 comprises one of more structures configured to support and at least partially enclose those components of electronic device 14. In particular embodiments, housing 24 may additionally enclose tag 18. Housing 24 may have any of a variety of sizes and shapes.

Input 26 comprises a device configured to facilitate the input of user customization selection settings for device 14. User customization selections are those selection settings for electronic device 14 which are different than factory custom settings (described below) or default settings. Such user customization selection settings include both altered values for selection settings which have been changed from the initial factory or default values and entirely new selection settings which have been added. Examples of user input customization selection settings comprising altered values include, but are not limited to, color or brightness selection settings as with a screen or display, print quality or resolution as with a printer, scanning resolution or quality as with a scanner, language, date/time format, digital senders configuration, paper size per tray, fax country settings and phone numbers. Examples of user input customization selection settings comprising new selection settings include, but are not limited to, other device associations and user added upgrades are enhancements. Examples of other device associations may include the Association of one of more printers with a computer, the Association of one of more external memory devices with a computer, the association of one or more music or video players with the computer and, vice versa. One example of user added upgrades or enhancements may include the upgrade a new version or a patch or the addition of supplemental programs or modules by the end user which add or change functionality of device 14.

Input 26 may comprise any device configured to facilitate interaction between device 14 and the end-user of device 14. Examples of such an input 26 include, but are not limited to, a keyboard, a mouse, a stylus, a touchpad, a microphone with appropriate voice recognition software, push buttons, slides, toggle switches and the like. Input 26 may additionally or alternatively be configured to facilitate input of customization selection settings to device 14 directly from other electronic devices. For example, input 26 may comprise a memory card slot, a disk drive, and optical or electrical connection port, a scanner and the like. Although input 26 is illustrated as being incorporated as part of housing 24, in other embodiments, input 26 may be distinct from or external to housing 24, wherein the input is in communication with electronic device 14 through wired, optical or wireless communication arrangements.

Output device 28 comprises that portion of electronic device 14 which provides a user with a desired one or more functions or output. Output device 28 may vary depending upon the desired function electronic device 14. Examples of output device 28 include, but are not limited to, media transportation mechanisms, print heads and the like as with printers, scan heads and potentially media transportation mechanisms as with scanners, a display, monitor or screen as with a computer, a computer monitor, a television, a personal data assistant (PDA), a charge coupled device and potentially a screen as with a digital video or photograph camera and the like. Output device 28 provides output based upon control signals from controller 30 which are generated based upon default settings, and custom settings which include user input custom settings (described above) and factory custom settings. Factory custom settings comprise factory installed adjustments made to original default settings. Such factory custom settings may vary depending upon the end customer of a particular electronic device. Examples of factory custom settings with a printer include, but are not limited to, duplex on-off, networking on-off, printer speed, memory allocation, and the levels of service such as the level of digital send (simple versus more complex).

Sensor 29 comprises one or more sensors or sensing devices configured to sense or detect various operating values or measurements of output device 28. Such operating data are generally the characteristics of output device 28 as output device 28 is functioning. Such operating data may vary over time and may change during operation of device 14 without further input or changes to device 14 by a user or an external electronic device. Such operating data may change due to environmental factors or degradation of one of more components of device 14. Examples of such operating data include, but are not limited to, hours of operation, events, failures or errors of output device 28, operating temperatures, operating speeds, environmental conditions, voltage levels, shock, vibrations and the like. For example, in embodiments in which electronic device 14 comprises a printer, sensor 29 may be configured to sense operating data such as hours of operation, events, failures or errors of output device 28, operating temperatures, operating speeds, environmental conditions, voltage levels, shock, vibrations and the like. In other embodiments, other operating data may be detected.

Controller 30 comprises a device configured to receive signals from sensor 29 representing sensed operating data and to record such operational information on tag 18. Controller 30 may additionally or alternatively be configured to store custom settings and to generate control signals for directing output by output device 28 based at least in part upon factory custom settings or default settings and any user input customization selection settings. Controller 30 generally includes processor 34 and memory 36.

Processor 34 comprises a processing unit which records such custom settings to memory 36 and which generate such control signals for output device 28 based upon value stored in memory 36. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 30 is not limited to any specific combination of hardware circuitry and software, nor to any particular source for the instructions executed by the processing unit.

Memory 36 comprises a data storage device configured to store data and instructions for processor 34. Memory 36 stores software and operating instructions for electronic device 14. Examples of memory 36 include any one or combination of volatile memory elements such as random access memory (RAM, DRAM, SRAM and the like) and nonvolatile memory elements (RAM, ROM, hard drive, tape, CD-ROM and the like). Memory 36 may incorporate electronic, magnetic, optical and/or other types of storage media. Memory 36 may also have a distributed architecture, were in various components are located remote from one another but can be accessed by processor 34.

RF tag 18 comprises a transponder configured to record data and to transmit data. In particular, each tag 18 is configured to receive data from controller 30 and to record such data in a memory. In particular, tag 18 is configured to receive and store sensed operating data and custom settings including one or both of user input customization selection settings and factory custom settings (collectively referred to as "custom settings") from controller 30. Tag 18 is further configured to wirelessly transmit such recorded data to retrieval system 20 when not under power from device 14 or when device 14 has failed. As a result, such data which may otherwise become lost upon failure of device 14 is preserved.

In one embodiment, tag 18 is further configured to wirelessly receive customization selection settings from retrieval system 20 and to further communicate such received customization selection settings to controller 30. As a result, tag 18 enables custom settings preserved by tag 18 upon failure of device 14 to be restored by controller 30 upon later repair of device 14.

In one embodiment, each tag 18 is configured to be hard wired to its associated electronic device 14, wherein data is transmitted from controller 30 or sensor 29 to the tag 18 through the wired connection 38. As a result, such data transmission is fast, reliable and inexpensive. Each tag 18 is further configured to be powered through the wired connection from device 14 when device 14 is powered or active. In other embodiments, tag 18 may be configured to communicate with its electronic device 14 or receive power in other fashions such as wirelessly.

In particular embodiments, tag 18 is configured to be removed from electronic device 14. In one embodiment, tag 18 is configured to be removed from its associated electronic device 14 without tools. In one embodiment, tag 18 is removably received within an opening, slot or cavity 40. As a result, tag 18 may be easily removed for repair, replacement or reuse with another electronic device. Moreover, tag 18 may be removed for facilitating reading of stored customization selection settings or operating data and for transfer of such stored customization selection settings or operating data to another device.

According to one example embodiment, tag 18 comprises an integrated circuit 43 and a coupling device 45. The integrated circuit 43 stores data while the coupling device 45 interfaces with a RF device such as a reader associated with retrieval system 20. In one embodiment, the coupling device 45 includes a coil which acts as a transmitting and receiving antenna. In one embodiment, tag 18 employs load modulation or electromagnetic backscatter at its antenna to send data back to retrieval system 20. In the embodiment illustrated, tag 18 comprises an antenna (coupler 45) connected to a capacitor (not shown) and a silicon chip (integrated circuit 43) encapsulated together and bonded onto a substrate 47, such as a resilient Acrylic or Mylar substrate. In one embodiment, tag 18 derives power from devices such as retrieval system 20 using either inductive coupling or electromagnetic capture. In other embodiments, tag 18 may include batteries. In one embodiment, tag 18 additionally includes FLASH memory configured to store recorded data. In other embodiment, tag 18 may have other configurations.

Retrieval system 20 comprises an arrangement of one or more devices configured to retrieve stored operating data and/or stored custom settings from tag 18. In the particular embodiment illustrated, system 20 is configured to retrieve such information wirelessly using radio frequency waves. In those embodiments in which system 20 retrieves operating data from tag 18, system 20 may additionally be configured to analyze the data and to diagnose a cause of failure for device 14 or to prescribe a fix or future safeguard for device 14. In those embodiments in which system 20 retrieves custom settings from tag 18, system 20 may additionally be configured to store such retrieved customization selection settings and to later restore the customization selection settings on the same device after the same device has been repaired or on another device. As a result, the custom settings are preserved and may be re-established without a user having to re-enter all of such selections or modifications.

In the particular example illustrated, retrieval system 20 generally includes RF device 50 and controller 52. RF device 50 (sometimes referred to as a "reader") comprises a device configured read data from tag 18 wirelessly such as through radio frequency waves. In the particular example illustrated, RF device 50 is additionally configured to write information to tag 18 wirelessly, such as using radio frequency waves. One example of an RF device is the LR 200B Long Range Reader commercially available from Feig Electronic of Weilburg, Germany, wherein the reader has modified addressing to handle additional memory.

Controller 52 comprises a device configured to generate control signals directing operation of device 50 and to record information retrieved by device 50 in a memory. As noted above, in particular embodiments, controller 52 may additionally be configured to analyze the retrieved operating data or to subsequently retransmit retrieved customization selection settings to the same device or another device. Controller 52 generally includes a processor 54 and memory 56.

Processor 54 comprises a processing unit which follows instructions contained in memory 56. Memory 56 comprises a data storage device configured to store data and instructions for processor 54. Memory 56 stores software and operating instructions for retrieval system 20. Examples of memory 56 include any one or combination of volatile memory elements such as random access memory (RAM, DRAM, SRAM and the like) and nonvolatile memory elements (RAM, ROM, hard drive, tape, CD-ROM and the like). Memory 56 may incorporate electronic, magnetic, optical and/or other types of storage media. Memory 56 may also have a distributed architecture, were in various components are located remote from one another but can be accessed by processor 54.

Figure 2:
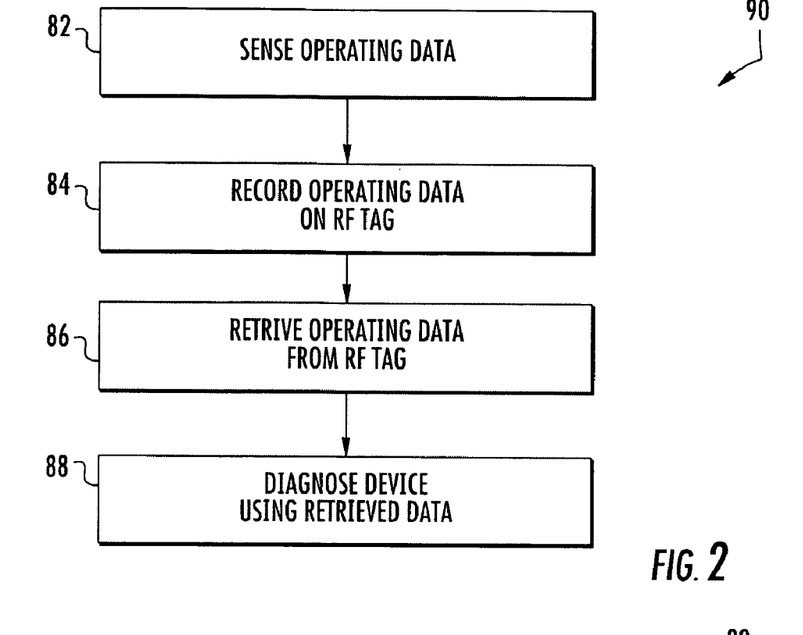
FIG. 2 is a flow diagram of a diagnostic method according to an example embodiment.
Figure 3:
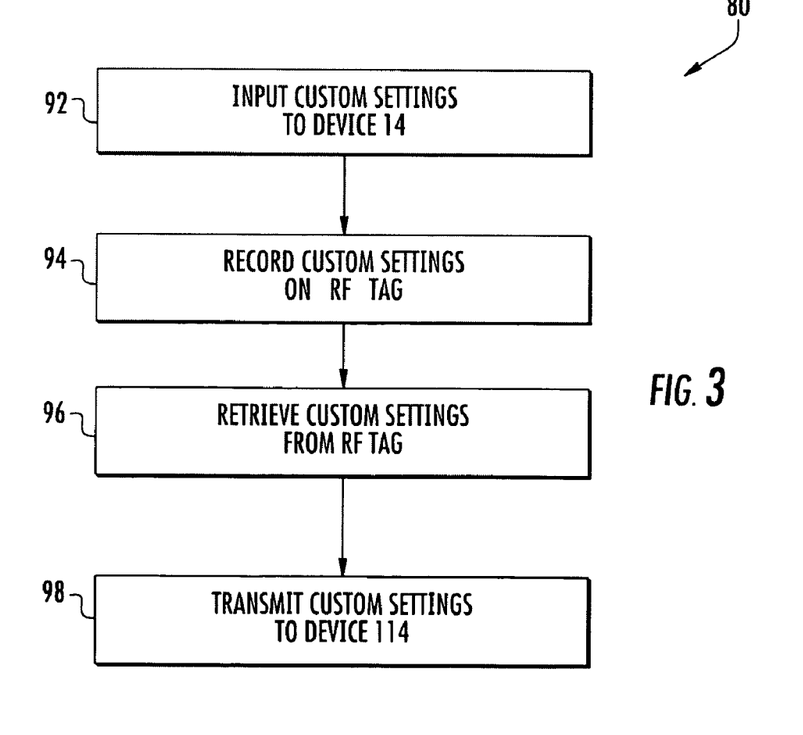
FIG. 3 is a flow diagram of a method for recovering user input custom selections according to an example embodiment.

FIGS. 2 and 3 are flow diagrams illustrating two example modes or methods of operation for system 10. FIG. 2 illustrates one example of a method 80 for diagnosing performance or failure of an electronic device, such as device 14 shown in FIG. 1. As indicated by step 82, during operation of device 14, sensor 29 senses one or more operating characteristics of output device 28. As indicated by step 84, the sensed operating data is recorded on RF tag 18. During such time, RF tag 18 may also be powered by device 14. In one embodiment, such data is recorded across a wired connection 38 to RF tag 18. In other embodiments, such communication may be performed in a wireless fashion. Such data is stored on RF tag 18 so as to not be lost or damaged upon failure of device 14.

Upon failure of device 14, either partially or completely, tag 18 is located in sufficiently close proximity to retrieval system 20 (shown in FIG. 1) so as to permit reading or retrieval of the recorded operating data from tag 18. As indicated by step 86, controller 52 of retrieval system 20 generates control signals directing RF device 50 to emit radio frequency waves including an energy component 64 and a data component 66 (shown in FIG. 1). The energy component 64 is received by tag 18 and powers tag 18. The data component 66 actuates circuitry of tag 18 such that tag 18 transmits the stored operating data to device 50 using radio frequency waves. RF device 50 receives the radio frequency waves transmitted by tag 18 and extracts the archived operating data of device 14. As indicated by step 88, the retrieved operating data for electronic device 14, prior to its failure, is used to diagnose device 14. In one embodiment, such diagnosis may be performed by controller 52, by another computing device or manually by a person. Such diagnosis may include determining the cause of failure for device 14 or prescribing a fix or solution for device 14.

Because system 10 records and facilitates retrieval of operating data which may otherwise be lost upon failure of device 14, system 10 enables more data or information points to be used in the diagnosis of device 14. At the same time, system 10 enables such stored operating data to be conveniently retrieved. For example, data from tag 18 may be wirelessly retrieved without removal of tag 18 from device 14. In other embodiments, tag 18 may be removed from device 14, whereby tag 18, itself, may be transported to retrieval system 20 while device 14 remains on site or is discarded FIG. 3 is a block diagram illustrating a method 90 for the recovery of user input customization selections by system 10. As indicated by step 92, controller 30 receives custom settings via input 26. Based upon such selection settings, if any, controller 30 generate control signals directing output device 28 to perform its one or more intended functions. As indicated by step 94, controller 30 records the custom settings to tag 18. In the embodiment illustrated, controller 30 communicates the custom settings and the operating data to tag 18 via a wired connection 38. In other embodiments, controller 30 may alternatively record the custom settings to tag 18 in other fashions.

As indicated by step 96, upon failure of device 114 or in other circumstances where retrieval of input custom selections from tag 18 is desired, processor 54 generates control signals directing device 50 to transmit radio frequency waves 62 (shown in FIG. 1) towards tag 18. Such radio frequency waves 62 include both an energy component 64 and a data component 66. The energy component 64 powers tag 18. The data component 66 requests information from tag 18. In response, tag 18 generates radio frequency waves representing the custom settings. RF device 50 receives such radio frequency waves, wherein the data represented by such waves is further received by controller 52. As indicated by step 98, controller 52 may store the retrieved information and may retransmit and/or install the retrieved information for restoring the same device or another device (such as device 114 shown in FIG. 4) to the same customized selection settings.

Figure 4:
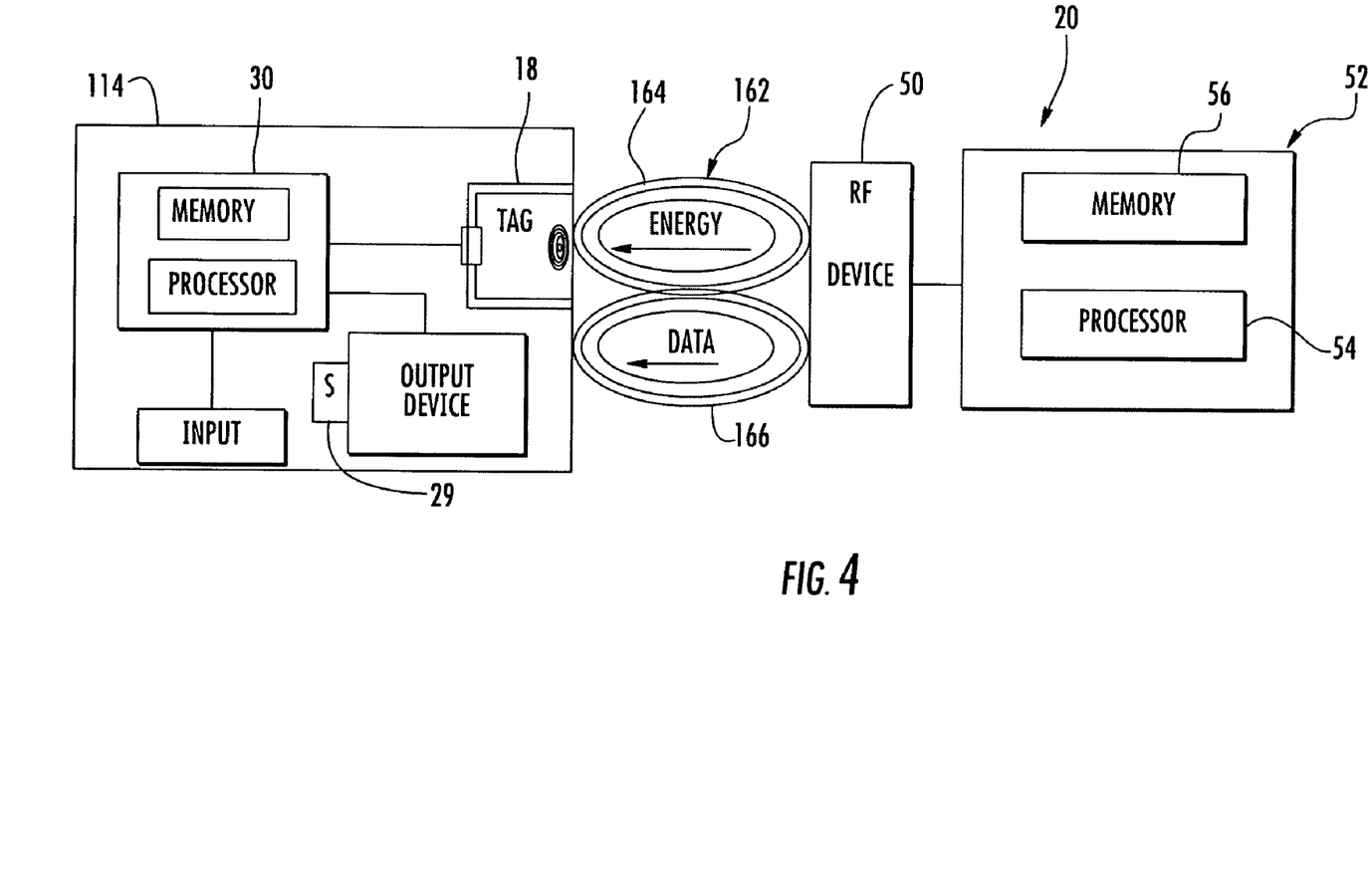
FIG. 4 is a schematic illustration of a portion of the system of FIG. 1 retransmitting user input custom selections to another electronic device according to an example embodiment.
Figure 5:
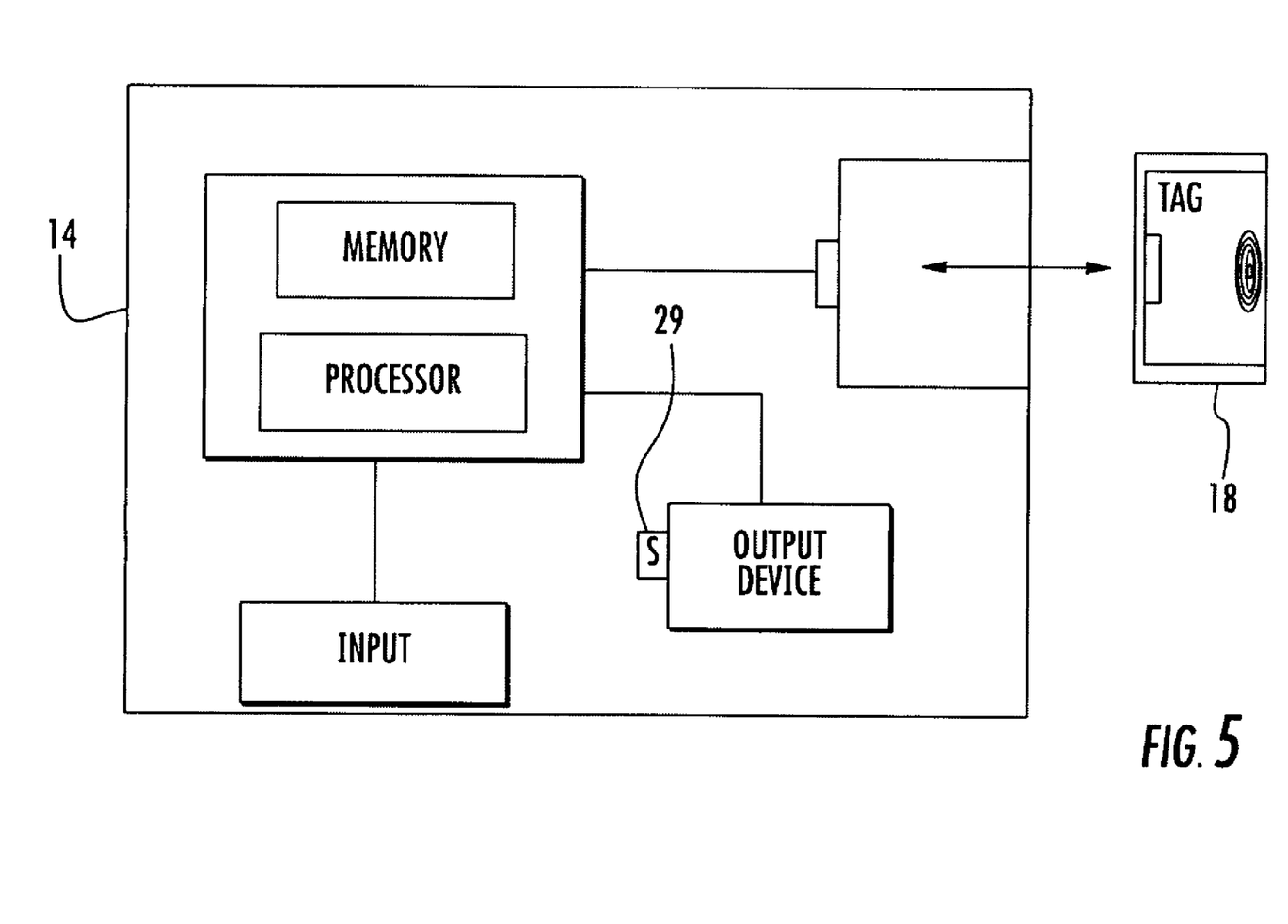
FIG. 5 is a schematic illustration of removal of a RF tag from the electronic device of FIG. 1 according to an example embodiment.
Figure 6:
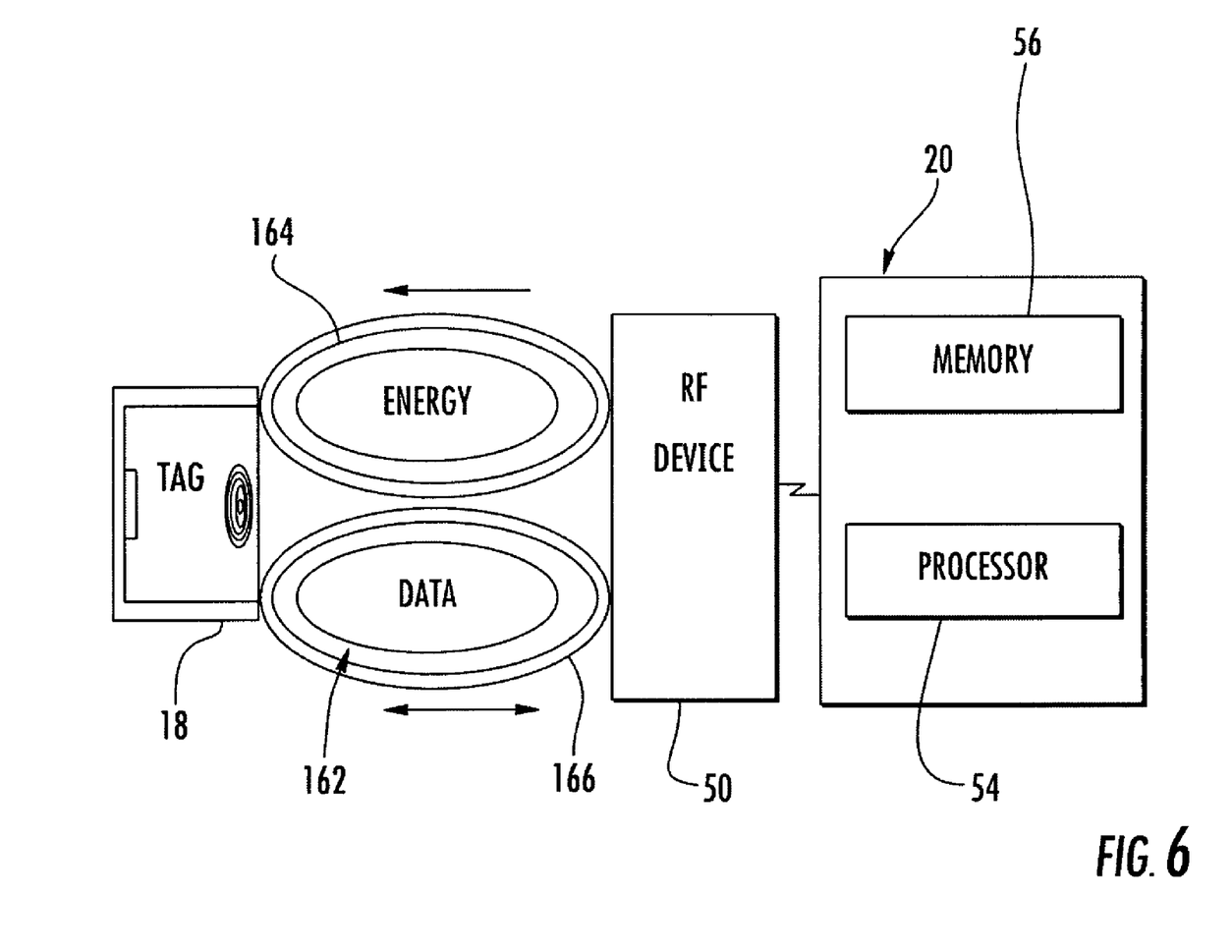
FIG. 6 is a schematic illustration of user input custom selections being transmitted from the tag of FIG. 5 to a retrieval system according to an example embodiment.

FIGS. 4-6 schematically illustrate various methods by which retrieved custom selections may be retransmitted and/or installed on a second device. As shown in FIG. 4, in one embodiment, retrieval system 20 may be positioned in sufficiently close proximity to a second electronic device 114 such that data and energy may be transmitted wirelessly via radio frequency waves between system 20 and device 114. In such an embodiment, device 114 may be substantially identical to device 14 except that device 114 is at factory or default selection settings or its selection settings are at other already input selections. As further shown by FIG. 4, processor 54 of controller 52 generates control signals directing RF device 50 to transmit radio frequency waves 162 including an energy component 164 and a data component 166. Energy component 164 powers tag 18 or an internal RF device of device 114. Data component 166 is received by tag 18 (or the internal RF component of device 114), wherein the data is extracted and communicated to controller 30. Thereafter, controller 30 stores and/or installs the received user custom selections. As a result, device 114 operates in a substantially similar fashion as failed device 14 without the user having to remember or re-enter such previously entered custom selections.

FIGS. 5 and 6 schematically illustrate another method by which retrieved user input custom selections may be transmitted and/or installed on another electronic device such as device 114 (shown in FIG. 4). As shown by FIG. 5, in lieu of transmitting the recorded custom selections via radio frequency waves to retrieval system 20 while tag 18 is fixed to device 14, tag 18 may be removed from device 14. As shown by FIG. 6, the removed tag 18 may then be positioned in close proximity to retrieval system 20. Processor 54 generates control signals directing device 50 to transmit radio frequency waves 62 which include an energy component 164 and a data component 166. The energy component 164 is received by tag 18 and powers tag 18. The data component 166 is received by tag 18 requesting tag 18 to transmit the stored input custom selections. In response, tag 18 transmits radio frequency waves 162 which are modulated so as to represent the recorded input custom selections to retrieval system 20. Retrieval system 20 extracts the custom selections and stores the custom selections in memory 56 or in another memory. Subsequently, retrieval system 20 transmits and/or installs the custom selections to another electronic device such as illustrated in FIG. 4. Overall, tag 18 provides greater flexibility as to the method by which custom selections stored on tag 18 may be retrieved and subsequently transmitted to the same repaired electronic device or another electronic device.

Figure 7:
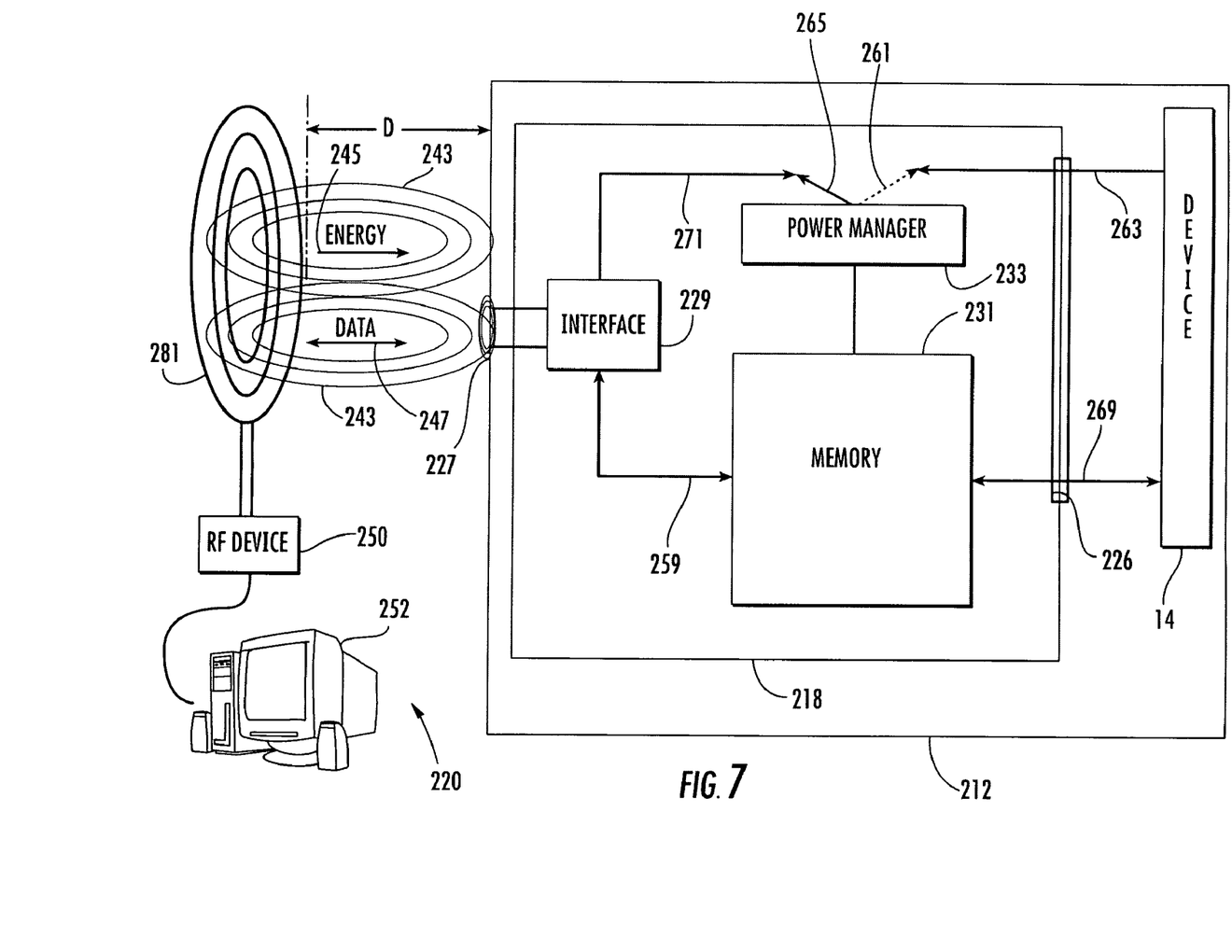
FIG. 7 is a schematic illustration of another embodiment of the RF recording and retrieval system of FIG. 1 according to an example embodiment.

FIG. 7 schematically illustrates system 220, another embodiment of system 10 (shown in FIG. 1). In particular, FIG. 7 illustrates the flow of power and data, while FIG. 7 may or may not depict control and logic components. As shown by FIG. 7, system 220 is similar to system 10 and includes device 14 (described above with respect to FIG. 1), tag 218 and retrieval system 220. Tag 218 comprises a transponder configured to communicate with device 14 through a wired connection. At the same time, tag 218 is also configured to communicate with retrieval system 220 wirelessly. In the embodiment illustrated, tag 218 includes two input/output ports, port 226, a wired port for communicating with device 14 and port 227, a radio frequency port comprising a radio frequency coil or antenna that facilitates wireless communication between retrieval system 220 and tag 218.

In the particular embodiment illustrated, tag 218 additionally includes interface 229, memory 231 and power manager 233. Interface 229 comprises that portion of an integrated circuit of tag 218 connected to the antenna of port 227 and configured (1) to facilitate communication from tag 218 to retrieval system 220 and (2) to facilitate the reception of both power and data wirelessly from retrieval system 220. When tag 218 is receiving power and data from retrieval system 220, interface 229 divides or separates the radio frequency waves 243 received via port 227 into their power or energy transmitting portions and their data transmitting portions. In particular, interface 229 demodulates the received radio frequency waves to pull or extract power off of the radio frequency waves, wherein the extracted power is transmitted to power manager 233 as indicated by arrow 271. At the same time, interface 229 transmits the extracted data component of the waves to memory 231 as indicated by arrow 259.

Memory 231 stores data transmitted by interface 229. In one embodiment, memory 231 is further connected to device 14 through port 226 as indicated by arrows 259. In one embodiment, memory 231 comprises a flash memory. In other embodiments, memory 231 may comprise other forms of memory.

Power manager 233 comprises a portion of an integrated circuit of tag 218 and is wired to memory 231 and to interface 229. Power manager 233 acts as a switch to selectively power memory 231 using power received from interface 229 (as indicated by arrow 271) or using power received from device 14 (as indicated by arrow 263). In particular, when device 14 is inactive or un-powered, power manager 233 is in the connection state shown by arrow 265 such that power extracted from radiofrequency waves 243 by interface 229 (as indicated by arrow 271) is transmitted to memory 231, permitting data in a memory 231 to be read or permitting data to be written to memory 231 by interface 229 as indicated by arrows 259 without power being received from device 14. When device 14 is powered or active, power manager 233 is in the connection state shown by broken arrow 267 such that power from device 14 is transmitted to memory 231, facilitating reading and writing of data to memory 231 by device 14 as indicated by arrows 269.

In one embodiment, tag 218 comprises a dual port integrated circuit having to input/output ports including a radio frequency port and a serial interface I²C port, a 125 kHz carrier frequency for its RF. interface and one kbyte of non-volatile memory. In one embodiment, tag 218 is configured to power up in response to an RF signal when tag 218 is spaced from an antenna of retrieval system 220 by less than or equal to distance D. In one embodiment, distance D is approximately 1 m. The serial interface port is wired to device 14. Power from device 14 is used when device 14 is powered. One example of tag 218 is a dual port integrated circuit such as Atmel AT24RF08 commercially available from Atmel Corporation. In other embodiments, other tags may be employed. For example, in other embodiments, tag 218 may alternatively operate at 13.56 MHz using ISO 15693 protocol. In such embodiment, memory 231 may have a non-volatile memory capacity of 8 kbyte. In yet other embodiments, tag 218 may operate at other frequencies and have other memory capacities.

Retrieval system 220 is similar to retrieval system 20. Retrieval system 220 create stored operating data from tag 218 and further retrieves user input custom selections from tag 218. Retrieval system 220 may additionally diagnose device 14 based upon the retrieved operating data. In some embodiments, retrieval system 220 may additionally retransmit and potentially install recovered user input custom selections on other devices. Retrieval system 220 includes RF device 250 and controller 252. RF device 250 is similar to RF device 22 in that RF device 250 is configured to read data from tag 218 and to record data to tag 218. As shown by FIG. 4, RF device 250 includes an antenna 281 through which electromagnetic radiation, such as radio frequency waves 243 are transmitted. Antenna 241 may have a variety of different sizes, shapes and configurations.

Controller 252 generates control signals correcting RF device 250 to retrieve or recover stored operating data and user input custom selections. In other embodiments, controller 252 may alternatively be configured to generate control signals directing device 250 to recover one of operating data or user input custom selections. Like controller 30, controller 252 includes a one or more processors 54 and a memory 56 (shown in FIG. 1). In the particular embodiment illustrated, controller 252 is embodied as a computer having a monitor. In the embodiment illustrated, controller 252 is configured to display the recovered operating data values and the recovered user input custom selections and as read from tag 218. In particular embodiments, controller 252 may enable a user to store or retransmit user input custom selections to the same device 14 after the device 14 has been repaired or to another device such that they previously entered selections do not have to be manually input once again.

In operation, upon complete or partial failure of device 14, tagged device 212 is positioned within distance D with respect to antenna 241. Controller 252 generates control signals directing device 250 to transmit waves 243 which are received by the antenna of port 217 of tag 218. During such transmission of waves 243, tag 218 is not receiving power from device 14. As indicated by arrow 245, the radio frequency waves 243 transmit energy which is received by interface 229 and transmitted to power manager 233 which further supplies power to memory 231. At the same time, as indicated by arrows 247, the radio frequency waves 243 are modulated so as to activate tag 218. Upon activation of tag 218, interface 229 modulates the antenna of port 217 to communicate the operating data and user input custom selections s stored on memory 231. In one embodiment, tag 218 may additionally include data corresponding to a public/private encryption code which is additionally transmitted to device 250. Such transmissions may occur while device 14 is unable to operate or power tag 218.

Upon recovery of the operating data, controller 252 diagnoses of failure or performance of device 14 using the operating data. Such diagnosis may include determining a cause of the failure or less than adequate performance of device 14 or may additionally or alternatively include prescribing an adjustment or fix for device 14 or for other similar devices to prevent similar failures. In particular embodiments, controller 252 may additionally be configured to retransmit and potentially install the retrieved user input custom selections to device 14 upon repair of device 14 or to other devices. Because system 220 stores such operating data and user input custom selections and permits wireless retrieval of such information, diagnosis of device 14 is enhanced and reinstatement of previously entered custom selections may be more convenient.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method comprising:
   transmitting operating data from an electronic device to a radio frequency (RF) tag;
   storing the operating data on the RF tag;
   recording custom settings including user input custom selections of the electronic device on the RF tag;
   removing the tag from the device upon failure of the device;
   transmitting the custom settings from the tag to a replacement electronic device; and
   recording the custom settings on the replacement device.

2. The method of claim 1, wherein the tag is removable from the device.

3. The method of claim 1, wherein the tag is wired to the electronic device.

4. The method of claim 1, wherein the tag is configured to permit wireless reading of the custom settings while the device is not operating.

5. The method of claim 1, wherein the RF tag contains custom settings and wherein the electronic device is configured to read the custom settings from the tag.

6. The method of claim 1, wherein the tag is configured to permit wireless reading of the operating data on the RF tag while the device is not operating.

7. The method of claim 1, wherein the electronic device comprises a printer.

8. The method of claim 1 further comprising:
   reading the operating data recorded on the RF tag; and
   diagnosing the device based on the operating data read from the RF tag.

9. The method of claim 1, wherein the operating data is selected from a group of data consisting of: hours of operation, events, failures or errors of the output device, operating temperatures, operating speeds, environmental conditions, shock, vibrations and voltage levels.

10. The method of claim 1, wherein the device comprises a first printer and wherein the replacement device comprises a second printer.

* * * * *